United States Patent
Keller et al.

(10) Patent No.: US 12,143,528 B2
(45) Date of Patent: Nov. 12, 2024

(54) PACKET DATA CONNECTIVITY CONTROL WITH VOLUME CHARGED SERVICE LIMITATION

(71) Applicant: TELEFONAKTIEBOLAGET L M ERICSSON (PUBL), Stockholm (SE)

(72) Inventors: Ralf Keller, Würselen (DE); Fredrik Lindholm, Stockholm (SE); Ivo Sedlacek, Hovorcovice (CZ)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/434,314

(22) PCT Filed: Apr. 14, 2014

(86) PCT No.: PCT/EP2014/057532
§ 371 (c)(1),
(2) Date: Apr. 8, 2015

(87) PCT Pub. No.: WO2015/158363
PCT Pub. Date: Oct. 22, 2015

(65) Prior Publication Data
US 2016/0261754 A1 Sep. 8, 2016

(51) Int. Cl.
*H04M 15/00* (2024.01)
*H04L 9/40* (2022.01)
(Continued)

(52) U.S. Cl.
CPC ........ *H04M 15/61* (2013.01); *H04L 12/1417* (2013.01); *H04L 12/1435* (2013.01);
(Continued)

(58) Field of Classification Search
CPC .. H04M 15/61; H04M 15/8038; H04M 15/60; H04M 2213/7009; H04W 8/205; H04W 4/24
See application file for complete search history.

(56) References Cited

U.S. PATENT DOCUMENTS 6,101,531 A * 8/2000 Eggleston ............. H04L 12/585
709/206
7,433,943 B1 * 10/2008 Ford ................... H04L 41/5009
370/235
(Continued)

FOREIGN PATENT DOCUMENTS

CN 101316434 A 12/2008
CN 202979021 U 6/2013
(Continued)

OTHER PUBLICATIONS

International Preliminary Report on Patentability for International Patent Application No. PCT/EP2014/057532, completed Aug. 3, 2016, 6 pages.
(Continued)

*Primary Examiner* — Muthuswamy G Manoharan
(74) *Attorney, Agent, or Firm* — Withrow & Terranova, PLLC

(57) ABSTRACT

A node of a wireless communication network (150; 160; 170; 210; 220; 230; 240) receives an indication from a user equipment (10). The indication indicates that a limitation of volume charged packet data services is required for the user equipment (10). Depending on the received indication, the node (150; 160; 170; 210; 220; 230; 240) prevents transmission of packet data associated with the volume charged packet data services and allows transmission of packet data associated with one or more other packet data services.

18 Claims, 10 Drawing Sheets

(51) Int. Cl.
  *H04L 12/14* (2006.01)
  *H04L 51/212* (2022.01)
  *H04L 51/58* (2022.01)
  *H04L 65/1016* (2022.01)
  *H04M 15/02* (2006.01)
  *H04W 4/24* (2024.01)
  *H04W 8/20* (2009.01)
  *H04W 88/02* (2009.01)

(52) U.S. Cl.
  CPC ............ *H04L 51/212* (2022.05); *H04L 51/58* (2022.05); *H04L 63/0227* (2013.01); *H04L 65/1016* (2013.01); *H04M 15/39* (2013.01); *H04M 15/60* (2013.01); *H04M 15/66* (2013.01); *H04M 15/8038* (2013.01); *H04M 15/8214* (2013.01); *H04M 15/853* (2013.01); *H04M 15/88* (2013.01); *H04M 15/888* (2013.01); *H04W 4/24* (2013.01); *H04W 8/205* (2013.01); *H04M 2215/34* (2013.01); *H04M 2215/7009* (2013.01); *H04W 88/02* (2013.01)

(56) References Cited

U.S. PATENT DOCUMENTS

| | | | | |
|---|---|---|---|---|
| 8,566,455 | B1 | 10/2013 | Zhao et al. | |
| 9,800,741 | B2* | 10/2017 | Zhang | H04W 4/24 |
| 2010/0043053 | A1* | 2/2010 | Wei | H04L 47/10 726/1 |
| 2011/0122885 | A1* | 5/2011 | Hedman | H04L 65/1016 370/412 |
| 2012/0092992 | A1 | 4/2012 | Pappas et al. | |
| 2012/0144049 | A1* | 6/2012 | Lopez Nieto | H04L 12/14 709/228 |
| 2015/0071128 | A1* | 3/2015 | Iwai | H04L 12/1403 370/259 |
| 2015/0223042 | A1* | 8/2015 | Li | H04M 15/88 455/406 |

FOREIGN PATENT DOCUMENTS

| | | |
|---|---|---|
| CN | 103299692 A | 9/2013 |
| EP | 2323332 A1 | 5/2011 |
| WO | 2011060974 A1 | 5/2011 |
| WO | 2012010336 A1 | 1/2012 |

OTHER PUBLICATIONS

Author Unknown, "IMS Profile for Conversational Video Service," Official Document IR.94, Version 5.0, GSM Association, Mar. 4, 2013, 16 pages.
Author Unknown, "Technical Specification Group Services and System Aspects; General Packet Radio Service (GPRS); Service description; Stage 2 (Release 12)," Technical Specification 23.060, Version 12.4.0, 3GPP Organizational Partners, Mar. 2014, 345 pages.
Author Unknown, "Technical Specification Group Services and System Aspects; Policy and charging control architecture (Release 11)," Technical Specification 23.203, Version 11.12.0, 3GPP Organizational Partners, Dec. 2013, 182 pages.
Author Unknown, "Technical Specification Group Services and System Aspects; Policy and charging control architecture (Release 12)," Technical Specification 23.203, Version 12.4.0, 3GPP Organizational Partners, Mar. 2014, 218 pages.
Author Unknown, "Technical Specification Group Services and System Aspects; IP Multimedia Subsystem (IMS); Stage 2 (Release 12)," Technical Specification 23.228, Version 12.4.0, 3GPP Organizational Partners, Mar. 2014, 307 pages.
Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.4.0, 3GPP Organizational Partners, Mar. 2014, 302 pages.
Author Unknown, "Technical Specification Group Services and System Aspects; Architecture enhancements for non-3GPP accesses (Release 12)," Technical Specification 23.402, Version 12.4.0, 3GPP Organizational Partners, Mar. 2014, 288 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.1.0, 3GPP Organizational Partners, Mar. 2014, 356 pages.
International Search Report for International Patent Application No. PCT/EP2014/057532, mailed Jun. 27, 2014, 4 pages.
First Office Action for Chinese Patent Application No. 201480078022.8, mailed Feb. 3, 2019, 10 pages.
Examination Report for European Patent Application No. 14717453.6, mailed Apr. 17, 2019, 5 pages.
Written Opinion for Brazilian Patent Application No. 112016022483, mailed May 25, 2020, 6 pages.
Supplementary Search for Chinese Patent Application No. 2014800780228, mailed Apr. 24, 2020, 2 pages.
First Office Action for Chinese Patent Application No. 202010728935.7, mailed May 21, 2024, 20 pages.

\* cited by examiner

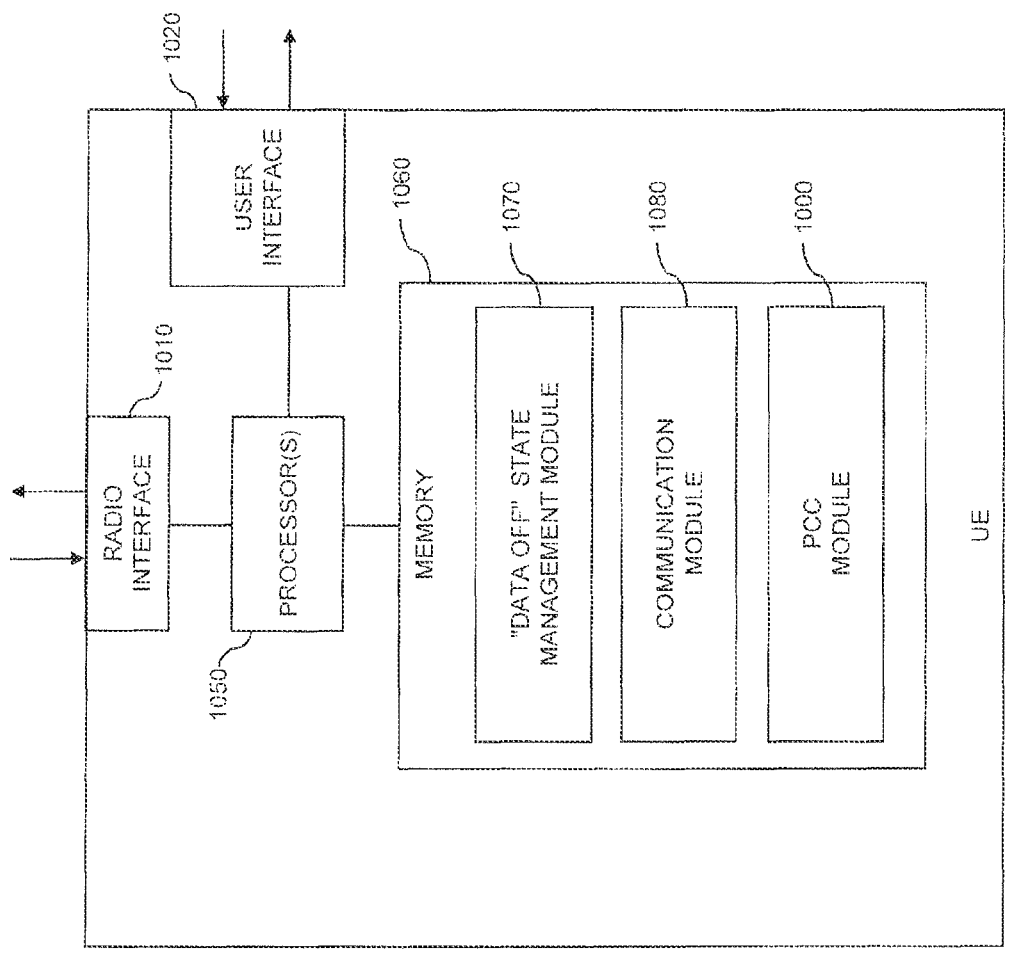

PACKET DATA CONNECTIVITY CONTROL WITH VOLUME CHARGED SERVICE LIMITATION

This application is a National Stage Entry under 35 USC 371 of International Application No. PCT/EP2014/057532 filed on Apr. 14, 2014, the disclosure of which is hereby incorporated by reference.

TECHNICAL FIELD

The present invention relates to methods for packet data connectivity and to corresponding devices.

BACKGROUND

In cellular networks, e.g., as specified by 3GPP (3$^{rd}$ Generation Partnership Project), a user equipment (UE) may establish a packet data connection for utilizing certain packet data services, in particular Internet Protocol (IP) based services. Such services may for example be provided by the IMS (IP Multimedia Subsystem) as specified in 3GPP TS 23.228 V12.4.0 (2014-03).

In the LTE (Long Term Evolution) cellular network technology specified by 3GPP, all connectivity is packet based, while other radio access technologies, e.g., 2G technologies such as GSM (Global System for Mobile Communications) or 3G technologies such as UMTS (Universal Mobile Telecommunication System) also allow circuit switched (CS) connections, e.g., for voice calls or SMS (Short Message Service). In the LTE technology, also voice and SMS need to be provided via packet based connectivity.

However, usage of packet based connectivity is in some cases not desired from a subscriber perspective. For example, a subscriber may have only limited quota for packet data, and exceeding this quota may cause undesired charging. Further, usage of packet based connectivity while roaming may also result in undesired charging. Accordingly, a common practice is to switch the UE in a "data off" state, or "data off when roaming" state.

On a 2G or 3G access, the selection of "data off" or "data off when roaming" has the effect of disabling usage all packet data connectivity access points, each identified by an APN (Access Point Name), by the UE. Accordingly, no packet data connectivity is established for the UE.

However, on an LTE access suppressing packet data connectivity may render the UE unusable. Further, if the UE does not provide an APN during initial attach, the default APN from the subscription is used to establish a PDN (Packet Data Network) connection. This might be the Internet APN or another APN which that should not be used when "data off" or "data off when roaming" is selected.

Accordingly, there is a need for techniques which allow for efficiently controlling packet based connectivity in a wireless communication network.

SUMMARY

According to an embodiment of the invention, a method of controlling packet based connectivity in a wireless communication network is provided. According to the method, a node of the wireless communication network receives, from a UE, an indication that a limitation of volume charged packet data services is required for the UE. Depending on the received indication, the node prevents transmission of packet data associated with the volume charged packet data services and allows transmission of packet data associated with one or more other packet data services.

According to a further embodiment of the invention, a method of controlling packet based connectivity in a wireless communication network is provided. According to the method, a UE detects a command to switch off packet data connectivity of the UE. In response to the command, the UE sends, to the wireless communication network, an indication that a limitation of volume charged packet data services is required for the UE.

According to a further embodiment of the invention, a node for a wireless communication network is provided. The node comprises at least one interface. Further, the node comprises at least one processor. The at least one processor is configured to receive, from a UE, an indication that a limitation of volume charged packet data services is required for the UE. Further, the at least one processor is configured to prevent transmission of packet data associated with the volume charged packet data services and allow transmission of packet data associated with one or more other packet data services. This preventing and allowing is accomplished depending on the received indication.

According to a further embodiment of the invention, a UE is provided. The UE comprises an interface for connecting to a wireless communication network. Further, the UE comprises at least one processor. The at least one processor is configured to detect a command to switch off packet data connectivity of the UE. Further, the at least one processor is configured to send to the wireless communication network an indication that a limitation of volume charged packet data services is required for the UE. This sending is accomplished in response to the command.

According to a further embodiment of the invention, a computer program or computer program product is provided, e.g., in the form of a non-transitory storage medium, which comprises program code to be executed by at least one processor of a node of a wireless communication network. Execution of the program code causes the at least one processor to receive, from a UE, an indication that a limitation of volume charged packet data services is required for the UE. Further, execution of the program code causes the at least one processor to prevent transmission of packet data associated with the volume charged packet data services and allow transmission of packet data associated with one or more other packet data services. This preventing and allowing is accomplished depending on the received indication.

According to a further embodiment of the invention, a computer program or computer program product is provided, e.g., in the form of a non-transitory storage medium, which comprises program code to be executed by at least one processor of a UE. Execution of the program code causes the at least one processor to detect a command to switch off packet data connectivity of the UE. Further, execution of the program code causes the at least one processor to send to the wireless communication network an indication that a limitation of volume charged packet data services is required for the UE. This sending is accomplished in response to the command.

Details of such embodiments and further embodiments will be apparent from the following detailed description of embodiments.

BRIEF DESCRIPTION OF THE DRAWINGS

FIG. 10 schematically illustrates structures of a UE according to an embodiment of the invention.

DETAILED DESCRIPTION OF EMBODIMENTS

In the following, concepts according to embodiments of the invention will be explained in more detail by referring to the accompanying drawings. The illustrated concepts relate to control of packet data connectivity in a wireless communication network. In the illustrated embodiments, it is assumed that the wireless communication network is based on the LTE technology as specified by 3GPP. However, it is to be understood that the illustrated concepts could be applied in a corresponding manner to other technologies, e.g., GSM, UMTS, or CDMA2000.

The concepts as illustrated in the following are based on an indication provided by a UE to the wireless communication network. By means of the indication, the UE can indicate that a limitation of volume charged packet data services is required for the UE. The indication has the purpose of preventing transmission of packet data traffic associated with the volume charged packet data services and allowing transmission of packet data traffic associated with one or more other packet data services by one or more nodes the wireless communication network. The UE may provide this indication when it is in a "data off" state or "data off when roaming" state. One or more nodes of the wireless communication network may react to this indication by taking appropriate measures to prevent the transmission of packet data associated with the volume charged packet data services and allowing the transmission of the packet data traffic associated with the one or more other packet data services. For example, a node which is responsible for providing a service to the UE may reject a request associated with the service or inactivate a volume charged component of the service. Further, a node which is responsible for controlling handling of user plane traffic of the UE may apply a policy, e.g., in the form of a packet filter, which blocks the packet data traffic associated with the volume charged services and allows the transmission of the packet data traffic associated with the one or more other packet data services. Such packet filter may for example be installed in a gateway. Further, such packet filter could also be installed in the UE, e.g., to selectively block the volume charged uplink packet data traffic from the UE.

The indication allows for establishing packet data connectivity of the UE while at the same time avoiding undesirable costs for the subscriber. In particular, certain services which are not subject to volume charging, e.g., a voice telephony service, a text based messaging service, or an electronic book service, may remain accessible for the UE, while volume charged services or media components of a service which are subject to volume charging, such as video, are blocked.

Further details of the concepts and exemplary implementations will now be explained with reference to the accompanying drawings.

Figure 1:
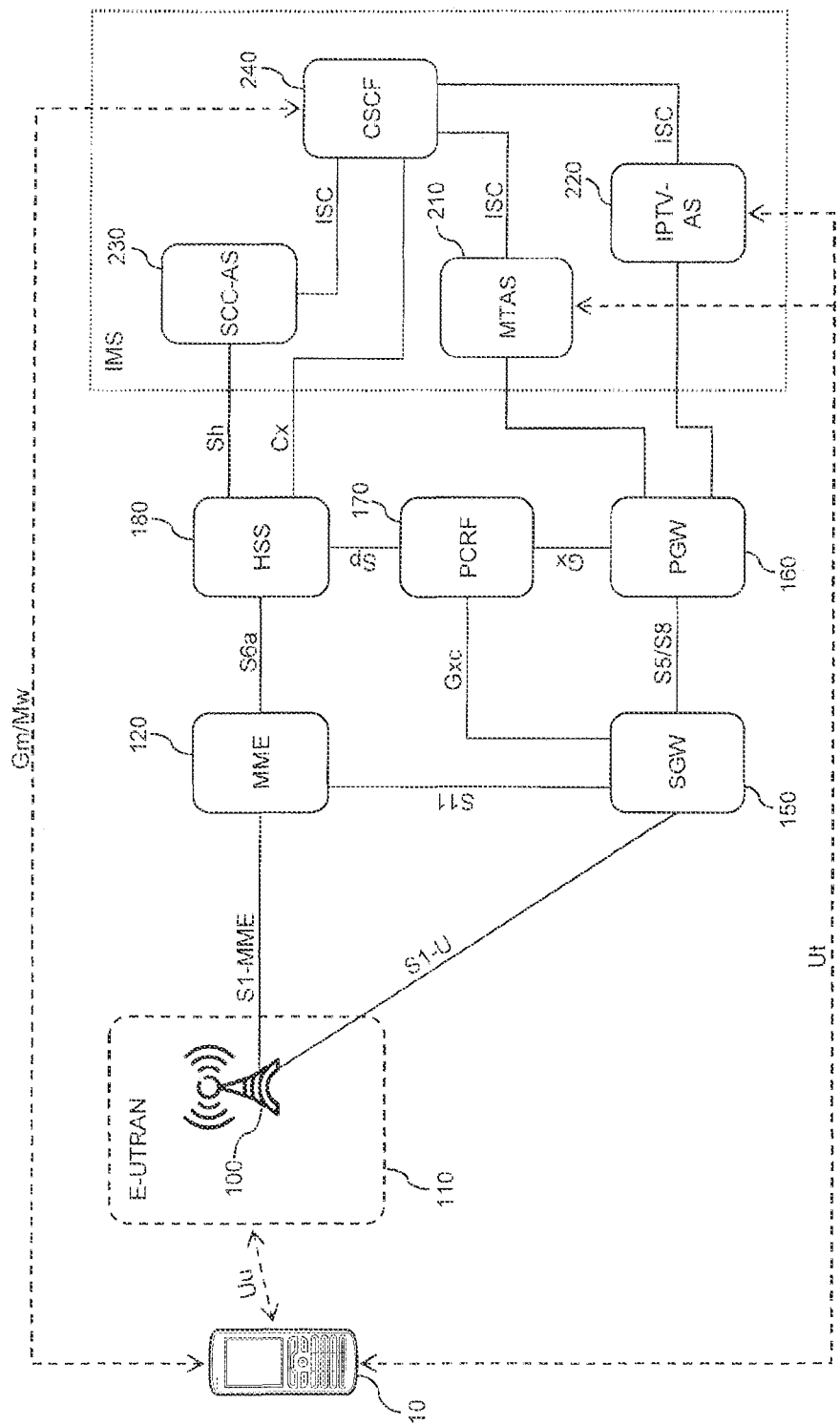
FIG. 1 schematically illustrates an exemplary architecture in which control of packet data connectivity may be implemented according to an embodiment of the invention.

FIG. 1 shows a block diagram for schematically illustrating an LTE based communication network architecture for implementation of the concepts as outlined above. As illustrated, the architecture provides an eNB 100, which is an exemplary base station of an access network 110, referred to as evolved UMTS Terrestrial Radio Access Network (E-UTRAN). Further the architecture provides a Mobility Management Entity (MME) 120, a Serving Gateway (SGW) 150, a Packet Data Network Gateway (PGW) 160, a Policy and Charging Rules Function (PCRF), and a Home Subscriber Server (HSS) 180. Further, FIG. 1 illustrates elements of the IMS, in particular a Telephony Application Server (TAS) 210, an IP television application server (IPTV-AS) 220, a Service Centralization and Continuity Application Server (SCC-AS) 230, and a Call Session Control Function (CSCF) 240.

The MME 120 may be responsible for controlling connectivity and managing mobility of UEs in the cellular network. The PCRF 170 may be responsible for policing and charging related functionalities, e.g., as specified in 3GPP TS 23.203 V12.4.0 (2014-03). The eNB 100, SGW 150, and the PGW 160 carry user plane data traffic of a UE 10. Between the eNB 100 and the UE 10, the user plane data traffic is carried over the LTE radio interface. The user plane data traffic is packet based, in particular based on IP data packets. Unless described otherwise below, the eNB 100, the MME 120, the SGW 150, PGW 160, PCRF 170, and HSS 180 may operate as specified by 3GPP, e.g., in 3GPP TS 23.401 V12.4.0 (2014-03) or 3GPP TS 23.402 V12.4.0 (2014-03).

The IMS nodes are responsible for providing an controlling various packet data services in the wireless communication network. Examples of such services are packet based voice telephony, packet based multimedia telephony, packet based text or multimedia messaging, or packet based mobile television. In the illustrated architecture, it is assumed that the TAS 210 is responsible for providing packet based voice telephony, packet based multimedia telephony, and/or packet based text or multimedia messaging and that the IPTV-AS 220 is responsible for providing packet based mobile television. The SCC-AS 230 may be responsible for centralized control of such services, e.g., with respect to termination of incoming CS or packets based calls, and for providing session continuity, e.g., when the UE moves between different accesses, in particular between an access supporting CS services and an access supporting backed based services. The CSCF 240 may be responsible for controlling sessions of the services, e.g., with respect to establishment of the session, modification of the session, or ending of the session. The CSCF 240 may for example act as a Serving CSCF (S-CSCF) for the UE 10, i.e., be located in the home network of the UE 10, or could act as a proxy CSCF (P-CSCF) for the UE 10, i.e., be located in a visited network in which the UE 10 is roaming or in the home network. Unless explained otherwise in the following, the functionalities of the IMS nodes may correspond to those as specified in 3GPP TS 23.228 V12.4.0.

As illustrated in FIG. 1, various interfaces are provided to allow communication in the architecture of FIG. 1. For communication between the UE 10 and the eNB 100, a radio interface referred to as Uu is provided. For communication between the eNB 100 and the SGW 150, an interface referred to as S1-U is provided. For communication between the SGW 150 and the PGW 160, an interface referred to as S5/S8 is provided. For communication between the eNB 100 and the MME 120, an interface referred to as S1-MME is provided. For communication between the MME 120 and the SGW 150, an interface referred to as S11 is provided. For communication between the MME 120 and the HSS 180, an interface referred to as S6a is provided. For communication between the PCRF 170 and the SGW 150, an interface referred to as Gxc is provided. For communication between the PCRF 170 and the PGW 160, an interface referred to as Gx is provided. For communication between the PCRF 170 and the HSS 180, an interface referred to as Sp is provided. For communication between the HSS 180 and the SCC-AS 230, an interface referred to as Sh is provided. For communication between the HSS 180 and the CSCF 240, an interface referred to as Cx is provided. For communication between the CSCF 240 and the application servers, i.e., the TAS 210, the SCC AS 230, and the IPTV-AS 220, an interface referred to as ISC is provided. Further, FIG. 1 illustrates an interface between the UE 10 and the application servers, which is referred to as Ut, and an interface between the UE 10 and the CSCF 240, which is referred to as Gm (between UE 10 and the P-CSCF) and Mw (between the P-CSCF and S-CSCF). These interfaces may be implemented as for example specified in 3GPP TS 23.203 V12.4.0, 3GPP TS 23.228 V12.4.0, 3GPP TS 23.401 V12.4.0, and 3GPP TS 23.402 V12.4.0. In accordance with the concepts as illustrated herein, some of these interfaces may be supplemented with a capability to transmit the above-mentioned indication that a limitation of volume charged packet data services is required.

In the following implementations of the concepts based on the indication that a limitation of volume charged packet data services is required will be explained in more detail with reference to the architecture as illustrated in FIG. 1 and exemplary processes. In these processes, it is assumed that the indication relates to IMS services and has the form "no volume charged IMS services", which may be provided as an additional information element in some of the illustrated messages. However, it should be understood that in other implementations, the indication could also refer to other volume charged packet data services or to volume charged services in general. Accordingly, the indication will also be referred to as "data off" indication. The indication may also further specify that its applies only when the UE is roaming, i.e., be a "data off when roaming" indication. In some implementations, the indication may also specify an access network in which it is applicable, e.g., that the indication is applicable to LTE access, but not to 2G or 3G accesses, such as GSM or UMTS. The latter additional attributes allow for deciding on the network side whether the indication should be applied for preventing volume charged packet data traffic. In this way, it can be avoided that the UE 10 needs to update the indication when changing status, e.g., between roaming to non-roaming or between LTE and another access network, e.g., based on GSM, UMTS, or WLAN (Wireless Local Area Network).

Figure 2:
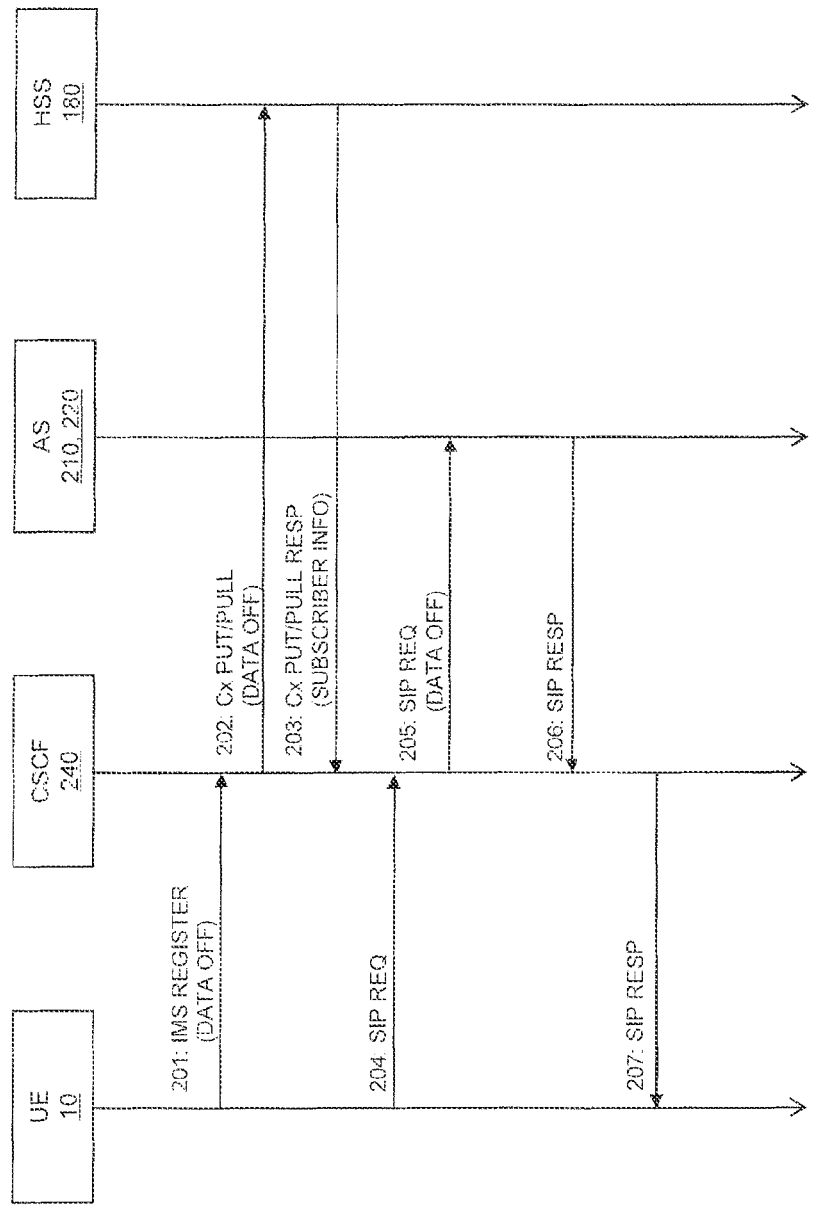
FIG. 2 schematically illustrates exemplary processes according to an embodiment of the invention.

FIG. 2 illustrates exemplary processes in which an IMS node uses the indication for preventing transmission of volume charged packet data traffic while allowing other packet data traffic. The processes of FIG. 2 involve the UE 10, the HSS 180, an application server (AS), such as the TAS 210, SCC AS 230, or IPTV-AS 220, and the CSCF 240. In the processes of FIG. 2, it is assumed that the UE 10 has established a PDN connection to the wireless communication network, using the IMS APN. The UE 10 may be in its home network or in a visited network.

By sending message 201 to the CSCF 240, the UE 10 registers in the IMS. Message 201 may be a message of the Session Initiation Protocol (SIP) as specified in IETF RFC 3261. The message 201 may be conveyed to the CSCF 240 via the Gm/Mw interface. The message 201 includes the "data off" indication, which is stored by the CSCF 240.

The CSCF 240 may then query the HSS 180 for subscriber information related to the UE 10, by sending message 202 to the HSS 180. Further, message 202 may include information for updating the HSS 180. For example, such information may indicate the presence of the "data off" indication, and the HSS 180 could this information for future utilization. Message 202 may correspond to a Cx Put/Pull message. In message 203, the HSS 180 responds with the subscriber information. The messages 202 and 203 may be transmitted over the Cx interface between the HSS 180 and the CSCF 240.

At some point, the UE 10 may request an IMS service, by sending message 204 to the CSCF 240. Message 204 may be a SIP message transmitted between the UE 10 and the CSCF 240. As illustrated, message 204 may be a SIP request. For example, the UE 10 may request establishment of a voice call by the TAS 210, may request establishment of a video call by the TAS 210, or may request establishment of a mobile television session by the IPTV-AS 220. Upon receiving the message 204, the CSCF 240 may for example perform processes for authorizing the requested IMS service.

In message 205, the CSCF 240 forwards the request of message 204 to the AS 210, 220. In message 205, the CSCF 240 may indicate whether the requested service is authorized and also which media components of the service are authorized. This information may depend on the "data off" indication from the UE 10. For example, if the service is completely based on volume charged packet data traffic, the CSCF 240 may decide to not authorize the requested service. Further, if the service is partially based on volume charged packet data traffic, the CSCF 240 may decide to authorize only media components which are not subject to volume charging. Still further, if the service is completely based on packet data traffic which is not subject to volume charging, it may decide to authorize the service with all media components. As illustrated, also the "data off" indication may be forwarded in message 205. This allows the AS 210, 220, 230 to decide whether the service or components thereof are allowable or not.

As illustrated, message 205 may be a SIP request. The AS 210, 220, 230 responds to the request of message 205 by sending message 206, which may be a SIP response, to the CSCF 240.

In particular, the AS 210, 220, 230 may decide to reject the request of message 205. This may for example be the case if the information in message 205 indicates that the service or all media components of the service are not authorized. Further, the AS 210, 220, 230 may take this decision on the basis of the "data off" indication, even if at least some components of the service are authorized by the CSCF 240. Further, the AS 210, 220, 230 may accept the request of message 205. This may for example be the case if the information in message 205 indicates that the service or at least some media components of the service are authorized. On the basis of the response in message 206, the CSCF 240 sends message 207 to the UE 10 to indicate the result of the decision by the AS 210, 220, 230 and/or by the CSCF 240. As illustrated, message 207 may be a SIP response message.

If at least some media components of the service are authorized, the AS 210, 220, 230 may then continue with the provision of the service to the UE 10, e.g., by sending packet data traffic associated with the service to the UE 10 and/or receiving packet data traffic associated with the service from the UE 10.

The following exemplary rules may be applied in the processes of FIG. 2: If the "data off" indication was provided by the UE 10, the IMS node 210, 220, 230, 240 responsible for the decision may disallow services with video media and filer transfers, but allow voice media and text messaging. As an alternative to disallowing all video media, the IMS node 210, 220, 230, 240 may allow certain video media which is not subject to volume charging, such as video media according to GSMA IR.94 V.5.0 (Mar. 4, 2013). If the "data off" indication is not provided by the UE 10, the IMS node 210, 220, 230, 240 may allow services and media components of these services, provided that there are no other reasons for disallowing some service or media components thereof.

The AS 210, 220, 230 may for example implement such policy by inactivating a disallowed media component, e.g., by modifying Session Description Protocol (SDP) information of the requested service. For example, the TAS 210 may inactivate video media from a request to establish a video call. Further, as mentioned above, the AS 210, 220, 230 may also reject requests, e.g., requests for file transfer or video transmission. For example, the IPTV-AS 220 could reject a request for streaming a video. In the case of rejecting a request, the originator of the request may be informed about the reason of rejection. In the exemplary scenario of FIG. 2, the UE 10 is the originator of the request of message 204 and may thus be informed of the rejection (and its reason) in message 207. However, it should be understood that in some cases the request for a service may also come from other entities than the UE 10. For example, in the case of a incoming call to be terminated at the UE 10, the request could originate from another AS. The CSCF 240 may implement such policy by not authorizing and inactivating services or media components of services which are subject to volume charging. For example, the CSCF 240 may authorize voice media and inactivate other media components, such as video. In some scenarios, it is also possible that separate nodes implement different parts of such policy. For example, an AS that handles voice and video calls may implement only the video related part of the policy, and another AS may implement the file transfer related part of the policy.

In the exemplary processes of FIG. 2, the "data off" indication is provided at IMS registration over the Gm/Mw interface. Alternatively or in addition, the "data off" indication could also be provided or updated over the Ut interface, i.e., directly to the AS 210, 220, 230. For example, the UE 10 may update the indication when changing between roaming and non-roaming status. Further, while in the processes of FIG. 2 the AS 210, 220, 230 may receive the "data off" indication from the CSCF 240 when an IMS service is requested, it would also be possible that the CSCF 240 already informs the AS 210, 220, 230 of the "data off" indication at IMS registration, similar to the HSS 180. Further, the AS 210, 220, 230 could also obtain the information concerning the "data off" indication from the HSS 180.

Figure 3:
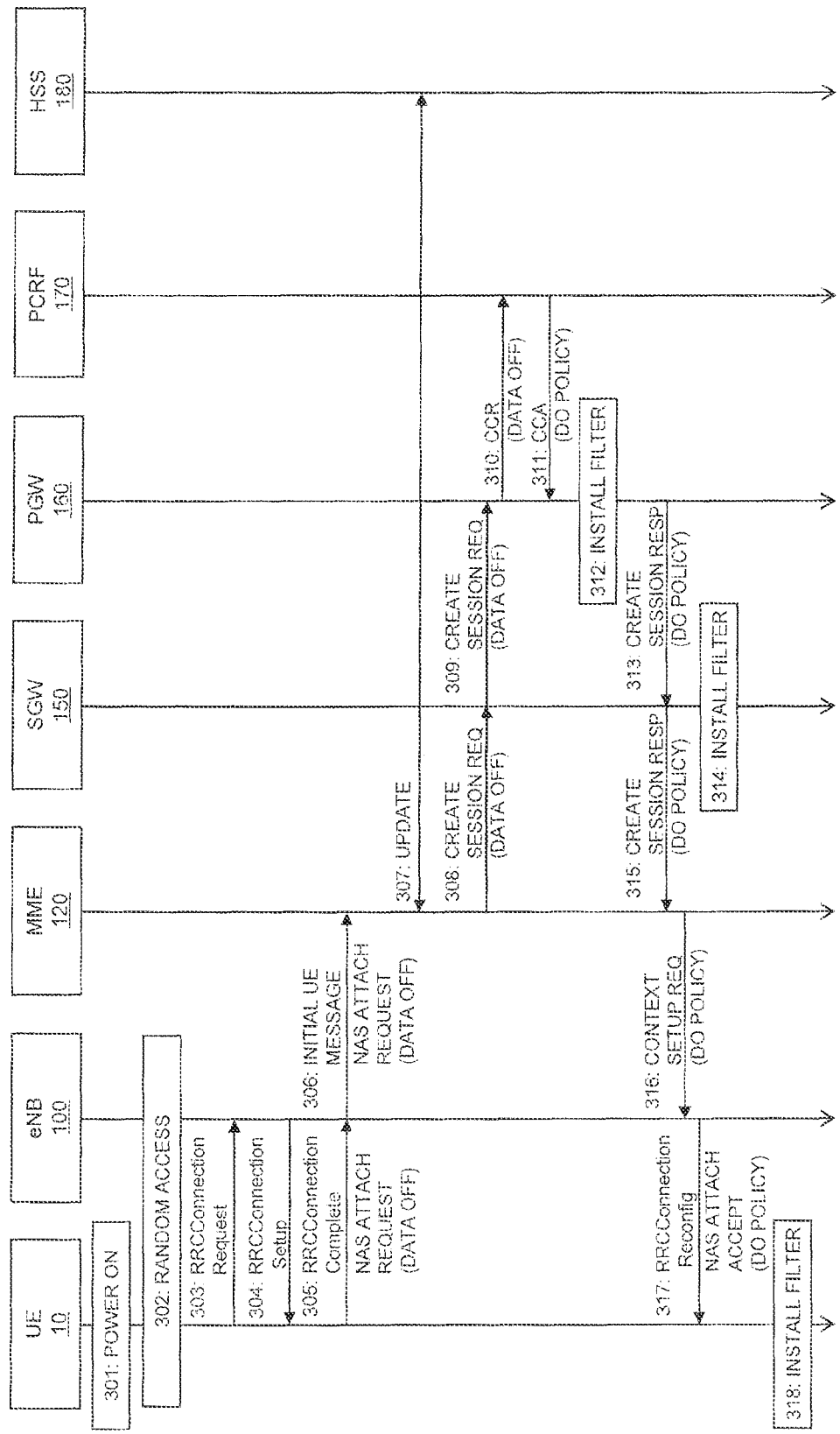
FIG. 3 schematically illustrates further exemplary processes according to an embodiment of the invention.

FIG. 3 illustrates exemplary processes in which the indication is applied by one or more in a policy and charging control (PCC) nodes of the communication network for preventing transmission of volume charged packet data traffic while allowing other packet data traffic. The processes of FIG. 3 involve the UE 10, the eNB 100, the MME 120, the SGW 150, the PGW 160, the PCRF 170, and the HSS 180. In the processes of FIG. 3, the UE 10 initially attaches to the wireless communication network to establish a PDN connection.

At step 301, the UE 10 powers on. This is assumed to occur the coverage region of a cell served by the eNB 100. Having selected this cell, the UE 10 continues by performing a random access procedure, as illustrated by step 302, and setting up a RRC (Radio Resource Control) connection. The RRC setup procedure involves that the UE 10 sends a message 303, referred to as RRCConnectionRequest, to the eNB 100, and that the eNB 100 responds with a message 304, referred to as RRCConnectionSetup. The UE 10 then sends message 305, referred to as RRCConnectionSetupComplete, to the eNB 100. The RRCConnectionSetupComplete message 305 includes initial NAS (Non Access Stratum) information to be provided to the eNB 100, in the present illustrated example a NAS Attach Request. The NAS attach request includes the above-mentioned "data off" indication. Details concerning the RRC connection procedure may be as for example specified in 3GPP TS 36.331 V12.1.0 (2014-03). Details of the NAS attach procedure and associated messages may be as for example specified in 3GPP TS 23.401 V12.4.0.

The eNB 100 forwards the initial NAS information, i.e., the NAS attach request with the "data off" indication, to the MME 120.

As illustrated by 307, the MME 120 may then update the HSS 180. This may involve sending an Update Location Request, e.g., as specified in 3GPP TS 23.401. This may also involve updating the HSS 180 with the information that the UE 10 provided the "data off" indication.

Further, the MME 120 sends a Create Session Request via the SGW 150 to the PGW 160, as illustrated by messages 308 and 309. In the illustrated implementation, the Create Session Request is used to forward the "data off" indication to the SGW 150 and PGW 160. Otherwise, the Create Session Request may be as specified in 3GPP TS 23.401 V12.4.0.

In the exemplary processes of FIG. 3, it is assumed that dynamic PCC is used. Accordingly, the PGW 160 contacts the PCRF 170 to create a policy control session over the Gx interface. In the exemplary procedures of FIG. 3, this is assumed to involve sending a Credit Control Request (CCR) 310 from the PGW 160 to the PCRF 170. By means of the CCR 310, the "data off" indication is forwarded to the PCRF 170. Depending on the indication, the PCRF 170 determines a PCC rule, according to which packet data traffic subject to volume charging is blocked for the UE 10, while other packet data traffic is allowed. In the following, this PCC rule will also be referred to as "data off" (DO) policy. This DO policy may in particular indicate or be used to configure a packet filter which blocks the volume charged packet data traffic and passes other packet data traffic. Such packet filter may be implemented as a correspondingly configured traffic flow template (TFT), as for example specified in 3GPP TS 23.060 V12.4.0 (2014-03). The DO policy or packet filter may also be determined in an APN specific manner. That is to say, different APNs may be associated with different APN policies. For example, only for the IMS APN some packet data traffic not subject to volume charging may be allowed, while for other APNs all packet data traffic is blocked when the "data off" indication is provided by the UE 10.

The PCRF 170 then responds to the CCR 310 by sending a Credit Control Answer (CCA) 311 to the PGW 160. The CCA 311 is also used to indicate the DO policy to the PGW 160. As illustrated by step 312, the PGW 160 may implement the DO policy by installing the corresponding packet filter. Alternatively, the PGW 160 may configure an existing packet filter in accordance with the indicated DO policy.

The PGW 160 then sends a Create Session Response via the SGW 150 to the MME 120, as illustrated by messages 313 and 315. In the illustrated implementation, the Create Session Response is used to forward the DO policy to the SGW 150 and to the MME 120. Otherwise, the Create Session Response may be as specified in 3GPP TS 23.401 V12.4.0. Having received message 313, i.e., the Create Session Response with the DO policy, the SGW 150 may install the corresponding packet filter, as indicated by step 314.

The MME 120 then sends a Context Setup Request to the eNB 100, as indicated by message 316. The Context Setup Request is used to forward the DO policy to the eNB 100. Otherwise, the Context Setup Request may be as specified in 3GPP TS 23.401 V12.4.0.

The eNB 100 then sends an RRCConnectionReconfig message 317 to the UE 10. The RRCConnectionReconfig message 317 may for example be in accordance with 3GPP TS 36.331 V12.1.0. The RRCConnectionReconfig message 317 includes a NAS Attach Accept message which is a response to the NAS Attach Request in the RRCConnectionSetupComplete message 305. The NAs Attach Request is used for forwarding the DO policy to the UE 10.

Having received the RRCConnectionReconfig message 317 with the DO policy, the UE 10 may install the corresponding packet filter, as indicated by step 318.

It is to be understood that further processes, not illustrated in FIG. 3, may be part of a typical initial attach procedure, such as specified in 3GPP TS 23.401 V12.4.0. For example, processes for configuring the default bearer or an additional bearer may be included. Further, rather than using dynamic PCC mechanisms, the DO policy could also be statically or preconfigured in the UE 10, SGW 150, and/or PGW 160, e.g., by a management procedure. Such preconfigured DO policy may be activated when the "data off" indication is provided by the UE 10.

Figure 4:
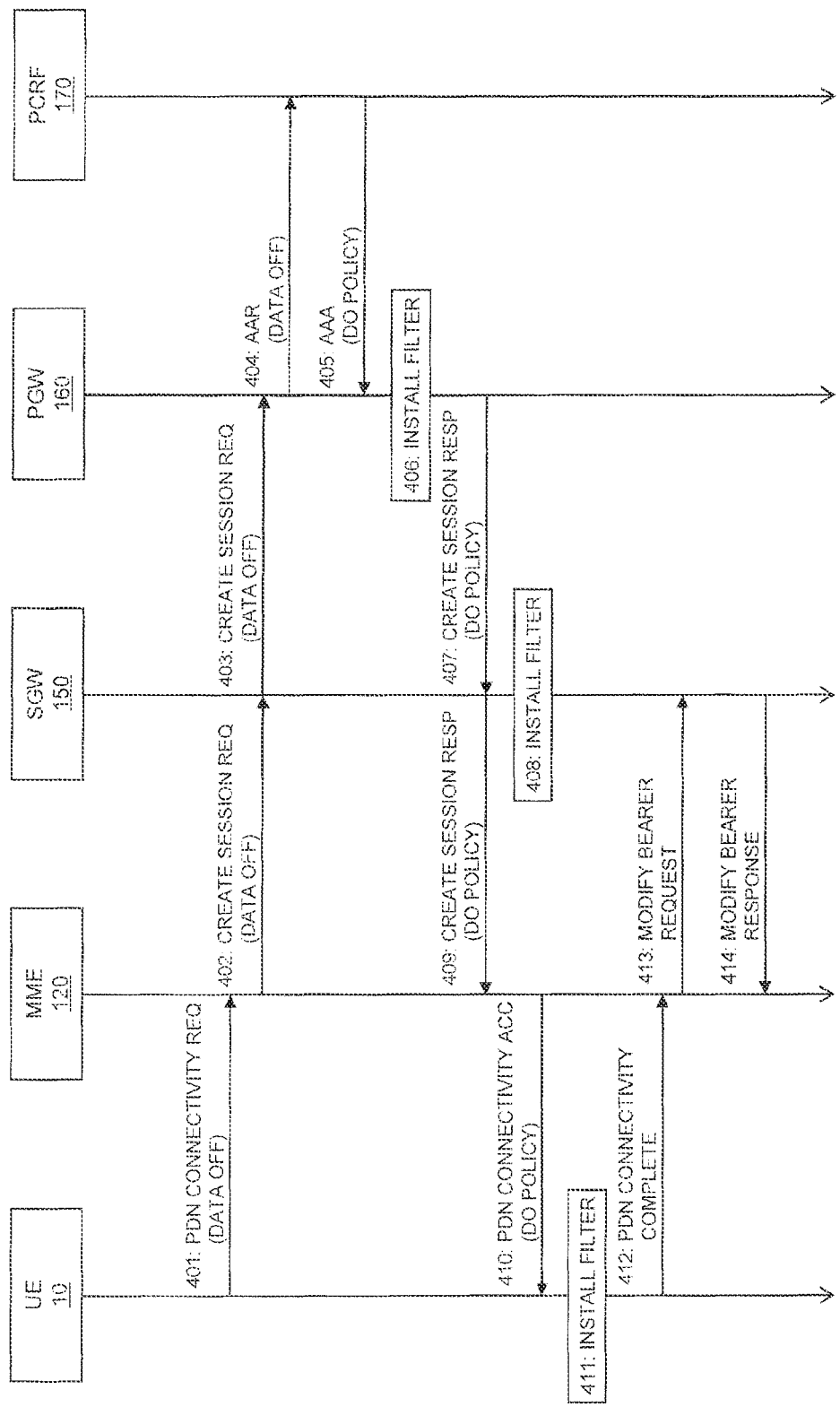
FIG. 4 schematically illustrates further exemplary processes according to an embodiment of the invention.

In some scenarios, the UE 10 may use different APNs, each for different services. Accordingly, a new PDN connection may need to be established for some services. FIG. 4 illustrates exemplary processes which use a PCC mechanism similar to the processes of FIG. 3, but in which the "data off" indication is provided in a PDN connection establishment procedure. The processes of FIG. 4 involve the UE 10, the MME 120, the SGW 150, the PGW 160, and the PCRF 170.

To establish the PDN connection, the UE 10 sends a PDN Connectivity Request 401. The PDN Connectivity Request is used for providing the "data off" indication to the MME 120. Otherwise, the PDN Connectivity Request may be as for example specified in 3GPP TS 23.401 V12.4.0.

The MME 120 then sends a Create Session Request via the SGW 150 to the PGW 160, as illustrated by messages 402 and 403. In the illustrated implementation, the Create Session Request is used to forward the "data off" indication to the SGW 150 and the PGW 160. Otherwise, the Create Session Request may be as specified in 3GPP TS 23.401 V12.4.0.

The PGW 160 the contacts the PCRF 170 to create a policy control session over the Gx interface for the new PDN connection. In the exemplary procedures of FIG. 4, this is assumed to involve sending a Authentication/Authorization Request (AAR) 404 from the PGW 160 to the PCRF 170. By means of the AAR 310, the "data off" indication is forwarded to the PCRF 170. Depending on the indication, the PCRF 170 determines a PCC rule, according to which packet data traffic subject to volume charging is blocked for the UE 10, while other packet data traffic is allowed, i.e., a DO policy. This DO policy may in particular indicate or be used to configure a packet filter which blocks the volume charged packet data traffic and passes other packet data traffic. Such packet filter may be implemented as a correspondingly configured TFT. The DO policy or packet filter may also be determined in an APN specific manner. That is to say, different APNs may be associated with different APN policies. For example, for one APN certain packet data traffic not subject to volume charging may be allowed, while for other APNs other packet data traffic not subject to volume charging may be allowed.

The PCRF 170 then responds to the AAR 404 by sending an Authentication/Authorization Answer (AAA) 405 to the PGW 160. The AAA 405 is also used to indicate the DO policy to the PGW 160. As illustrated by step 406, the PGW 160 may implement the DO policy by installing the corresponding packet filter. Alternatively, the PGW 160 may configure an existing packet filter in accordance with the indicated DO policy.

The PGW 160 then sends a Create Session Response via the SGW 150 to the MME 120, as illustrated by messages 407 and 409. In the illustrated implementation, the Create Session Response is used to forward the DO policy to the SGW 150 and to the MME 120. Otherwise, the Create Session Response may be as specified in 3GPP TS 23.401 V12.4.0. Having received message 407, i.e., the Create Session Response with the DO policy, the SGW 150 may install the corresponding packet filter, as indicated by step 408.

The MME 120 then sends a PDN Connectivity Accept message 410 UE 10. The PDN Connectivity Accept message 410 is used to forward the DO policy to the UE 10. Otherwise, the PDN Connectivity Accept message 410 may be as specified in 3GPP TS 23.401 V12.4.0.

Having received the PDN Connectivity Accept message 410 with the DO policy, the UE 10 may install the corresponding packet filter, as indicated by step 410.

Further, the UE 10 may send a PDN Connectivity Complete message 413 to the MME 120, thereby confirming establishment of the new PDN connection. The MME 120 may then send a Modify Bearer Request 413 to the SGW 150, which the SGW 150 may confirm by sending a Modify Bearer Response 414. These procedures may for example be as specified in 3GPP TS 23.401.

Also in the processes of FIG. 4, a preconfigured DO policy could be used in place of the dynamically DO policy.

After having provided the "data off" indication, the state of the UE 10 may change to a normal state, in which full packet data connectivity of the UE 10 is desired. Also this change of the "data off" indication may be indicated by the UE 10 to the wireless communication network. In scenarios where the prevention of the transmission of volume charged data traffic is implemented by an IMS node, such as in the processes of FIG. 2, this may be achieved by an update procedure initiated by the UE 10, e.g., by a Tracking Area Update. In scenarios where the prevention of the transmission of volume charged data traffic is implemented by a DO policy, such as in the processes of FIG. 3 or 4, this may be achieved by the UE 10 sending a request or other message to the MME 120. In this request, the change of the "data off" state may be indicated implicitly, by not including the "data off" indication, or may be indicated by an explicit "data on" indication. The MME 120 may then forward this information to the SGW 150, PGW 160 and PCRF 170, by sending a Modify Bearer Request which includes a corresponding indication (or in which the "data off" indication is omitted).

Figure 5:
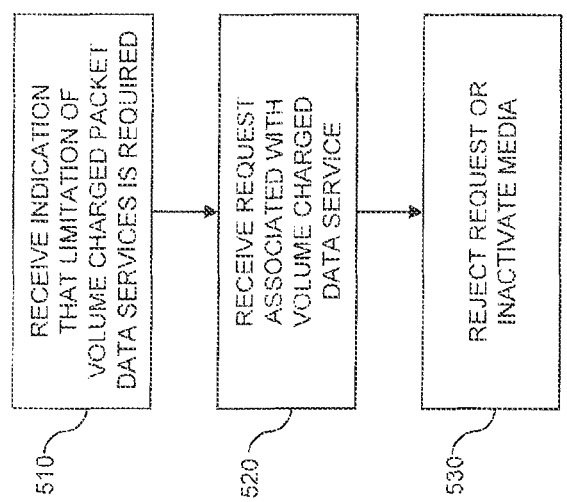
FIG. 5 shows a flowchart for illustrating a method according to an embodiment of the invention, which for example may be implemented by an IMS node.

FIG. 5 shows a flowchart for illustrating a method of controlling packet data connectivity in a wireless communication network. The method of FIG. 5 may be used for implementing the above concepts in a node of the wireless communication network, in particular in a node which is responsible for providing a packet data service, e.g. an application server such as the TAS 210, the IPTV-AS 220, or the SCC-AS 230, or in a node which is responsible for authorizing a packet data service, e.g., a CSCF such as the CSCF 240. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 510, the node receives an indication from a UE, e.g., from the UE 10. The indication indicates that a limitation of volume charged packet data services is required for the UE. The indication may indicate that none of the volume charged packet data services are allowed for the UE, such as the above-mentioned "data off" indication. Alternatively, the indication may indicate that none of the volume charged packet data services are allowed while the UE 10 is roaming, such as the above-mentioned "data off when roaming" indication. In some implementations, the indication may further indicate one or more access networks in which the indication is applicable, e.g., that the indication is applicable for LTE access networks, but not for 2G or 3G access networks. The volume charged services may for example correspond to services of an IMS of the wireless communication system. The indication may be provided in a procedure for registering for the volume charged packet data services, e.g., during IMS registration or in a procedure of updating IMS registration.

Depending on the received indication, the node prevents transmission of packet data traffic associated with the volume charged packet data services and allows transmission of packet data traffic associated with one or more other packet data services. In the method of FIG. 5, this involves that the node controls provision or authorization of at least one of the volume charged packet data services in accordance with the received indication.

In particular, at step 520 the node may receive a request associated with at least one of the volume charged packet data services. For example, the node may be an application server which is responsible for providing the at least one volume charged packet data service, such as one of the application servers 210, 220, 230, and the request may be a request for establishing a session of the at least one volume charged packet data service. An example of such request is the SIP request 204 in the processes of FIG. 2. Alternatively, the node may be a control server which is responsible for authorizing the at least one volume charged packet data service, such as the CSCF 240, and the request may be a request for authorization of a session of the volume charged packet data service. An example of such request is the SIP request 205 in the processes of FIG. 2.

At step 530, in response to the indication provided by the UE, the node prevents the transmission of the packet data traffic associated with the at least one volume charged packet data service. For this purpose, the node may reject the request of step 520 or inactivate a media component of the at least one of the volume charged service requested for the UE.

Figure 6:
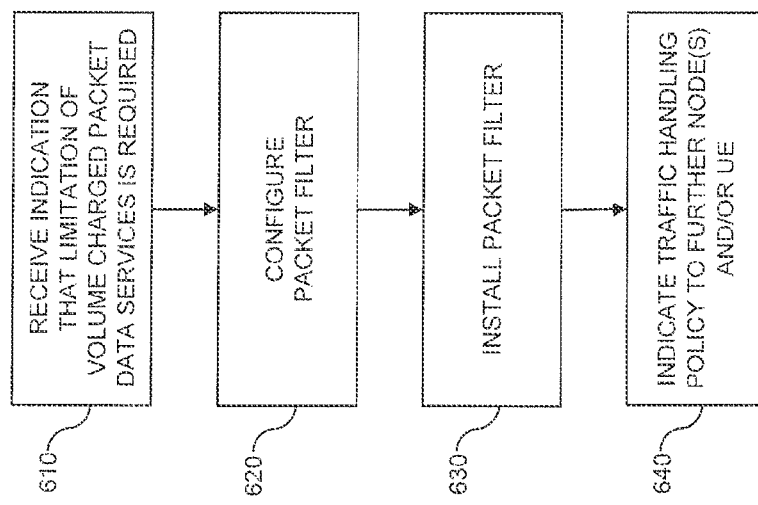
FIG. 6 shows a flowchart for illustrating a further method according to an embodiment of the invention, which for example may be implemented by a node controlling handling of user plane data traffic.

FIG. 6 shows a flowchart for illustrating a further method of controlling packet data connectivity. The method of FIG. 6 may be used for implementing the above concepts in a node of a wireless communication network, in particular in a node which is responsible for controlling packet data traffic, e.g., a gateway such as the SGW 150 or PGW 150, or a policy controller, such as the PCRF 170. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 610, the node receives an indication from a UE, e.g., from the UE 10. The indication indicates that a limitation of volume charged packet data services is required for the UE. The indication may indicate that none of the volume charged packet data services are allowed for the UE, such as the above-mentioned "data off" indication. Alternatively, the indication may indicate that none of the volume charged packet data services are allowed while the UE 10 is roaming, such as the above-mentioned "data off when roaming" indication. In some implementations, the indication may further indicate one or more access networks in which the indication is applicable, e.g., that the indication is applicable for LTE access networks, but not for 2G or 3G access networks. The volume charged services may for example correspond to services of an IMS of the wireless communication system. The node may receive the indication in a request of a procedure for attaching the UE to the wireless communication network. Alternatively or in addition, the node may receive the indication in a request of a procedure for configuring packet data network connectivity between the UE and the wireless communication network.

Depending on the received indication, the node prevents transmission of packet data traffic associated with the volume charged packet data services and allows transmission of packet data traffic associated with one or more other packet data services. In the method of FIG. 6, this involves that the node controls traffic handling in the wireless communication network, e.g., using a PCC mechanism.

In particular, at step 620 the node may configure at least one packet filter to prevent the transmission of the data traffic associated with the volume charged packet data services. The at least one packet filter blocks the packet data traffic associated with the volume charged packet data services and passes the packet data traffic associated with the one or more other packet data services. The at least one packet filter may operate in the node. That is to say, the node may also install the at least one packet filter, as indicated by step 630. For example, the PGW 160 could configure and locally install the at least one packet filter. Alternatively or in addition, the at least one packet filter may operate in a further node of the wireless communication network. The node may then indicate the at least one packet filter to such further node, as indicated by step 640. For example, the node may correspond to the PCRF 170 and indicate the at least one packet filter to the PGW 160 and/or SGW 150. Alternatively or in addition, the at least one packet filter may operate in the UE. The node may then indicate the at least one packet filter to the UE, as indicated by step 640. For example, the node may correspond to the PCRF 170, PGW 160, or SGW 150, and indicate the packet filter to the UE 10.

Figure 7:
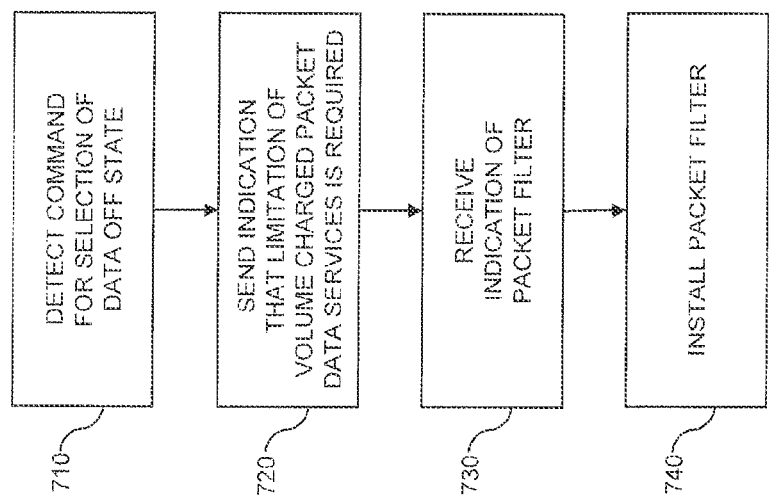
FIG. 7 shows a flowchart for illustrating a further method according to an embodiment of the invention, which for example may be implemented by a UE.

FIG. 7 shows a flowchart for illustrating a further method of controlling packet data connectivity. The method of FIG. 7 may be used for implementing the above concepts in a UE, such as the UE 10. If a processor based implementation of the UE is used, the steps of the method may be performed by one or more processors of the UE. For this purpose, the processor(s) may execute correspondingly configured program code. Further, at least some of the corresponding functionalities may be hardwired in the processor(s).

At step 710, the UE detects a command to switch off packet data connectivity of the UE. This command may be based on a user selection, e.g., a selection of "data off" or "data off when roaming". Alternatively, this command could be generated by an automatic process in the UE, e.g., a scheduled switching between "data off" and "data on" states or a process in which the command is triggered by a mobility event, such as entry of a visited network or attaching to a certain access network, such as an LTE access network.

At step 720, in response to the command of step 720, the UE sends an indication to the wireless communication network. The indication indicates that a limitation of volume charged packet data services is required for the UE. The indication may indicate that none of the volume charged packet data services are allowed for the UE, such as the above-mentioned "data off" indication. Alternatively, the indication may indicate that none of the volume charged packet data services are allowed while the UE 10 is roaming, such as the above-mentioned "data off when roaming" indication. In some implementations, the indication may further indicate one or more access networks in which the indication is applicable, e.g., that the indication is applicable for LTE access networks, but not for 2G or 3G access networks. The volume charged services may for example correspond to services of an IMS of the wireless communication system. The UE may send the indication in a request of a procedure for attaching the user equipment to the wireless communication network. Alternatively or in addition, the UE may send the indication in a procedure for configuring packet data network connectivity between the UE and the wireless communication network. Still further, the UE may send the indication in a procedure for registering the UE for at least one of the volume charged packet data services.

At step 730, in response to sending the indication, the UE may receive an indication of a packet filter and install the packet filter at step 740. The packet filter blocks the packet data traffic associated with the volume charged packet data services and passing the packet data traffic associated with the one or more other packet data services.

Figure 8:
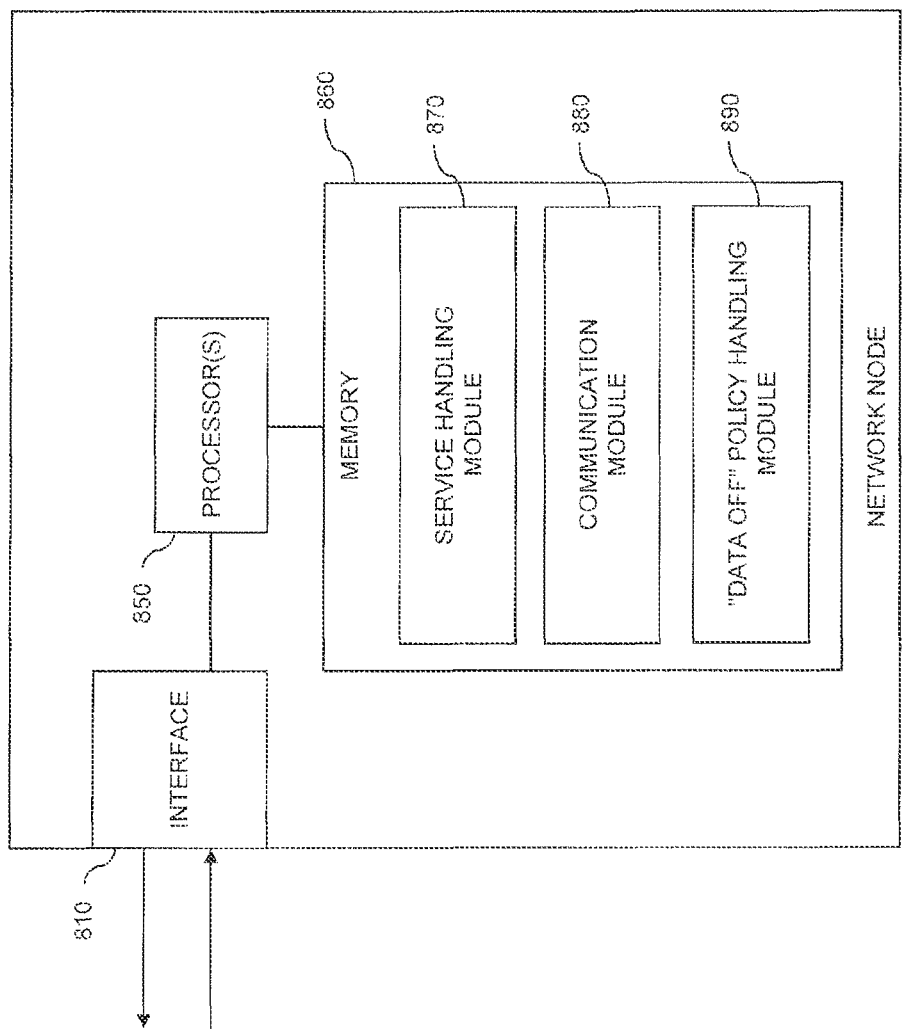
FIG. 8 schematically illustrates structures of a node according to an embodiment of the invention, e.g., corresponding to an IMS node.

FIG. 8 illustrates exemplary structures for implementing the above concepts in a node of a wireless communication network. For example, the illustrated structures may be used to implement an application server, e.g., an IMS application server such as the TAS 210, the IPTV-AS 220, or the SCC-AS 230, or a control function related to a packet data service, such as the CSCF 240.

In the illustrated example, the node includes an interface 810 for providing or controlling a packet data service. For example, the interface 810 may correspond to a SIP based interface, such as Gm or Mw interface as illustrated in the architecture of FIG. 1.

Further, the node includes one or more processor(s) 850 coupled to the interface 810, and a memory 860 coupled to the processor(s) 850. The memory 860 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 860 includes suitably configured program code modules to be executed by the processor(s) 850 so as to implement the above-described functionalities of the node, e.g., corresponding to the method steps of FIG. 5. More specifically, the program code modules in the memory 860 may include a service handling module 870 so as to implement the above-described functionalities of providing or authorizing the packet data service. Further, the program code modules in the memory 860 may include a communication module 880 so as to implement the above-described functionalities of receiving the "data off" indication. Still further, the memory 860 may include a "data off" policy handling module 890 so as to implement the above-mentioned functionalities of selectively preventing the transmission of the packet data traffic subject to volume charging in response to receiving the "data off" indication, e.g., by rejecting a request associated with the packet data service subject to volume charging or inactivating a media component of the packet data service.

It is to be understood that the structures as illustrated in FIG. 8 are merely schematic and that the node may actually include further components which, for the sake of clarity, have not been illustrated, e.g., further interfaces or further processors. Also, it is to be understood that the memory 860 may include further types of program code modules, which have not been illustrated, e.g., program code modules for implementing known functionalities of an application server or control server, such as an IMS application server or CSCF. In some implementations, also a computer program may be provided for implementing functionalities of the node, e.g., in the form of a physical medium storing the program code modules to be stored in the memory 860 or by making such program code available for download or streaming.

Figure 9:
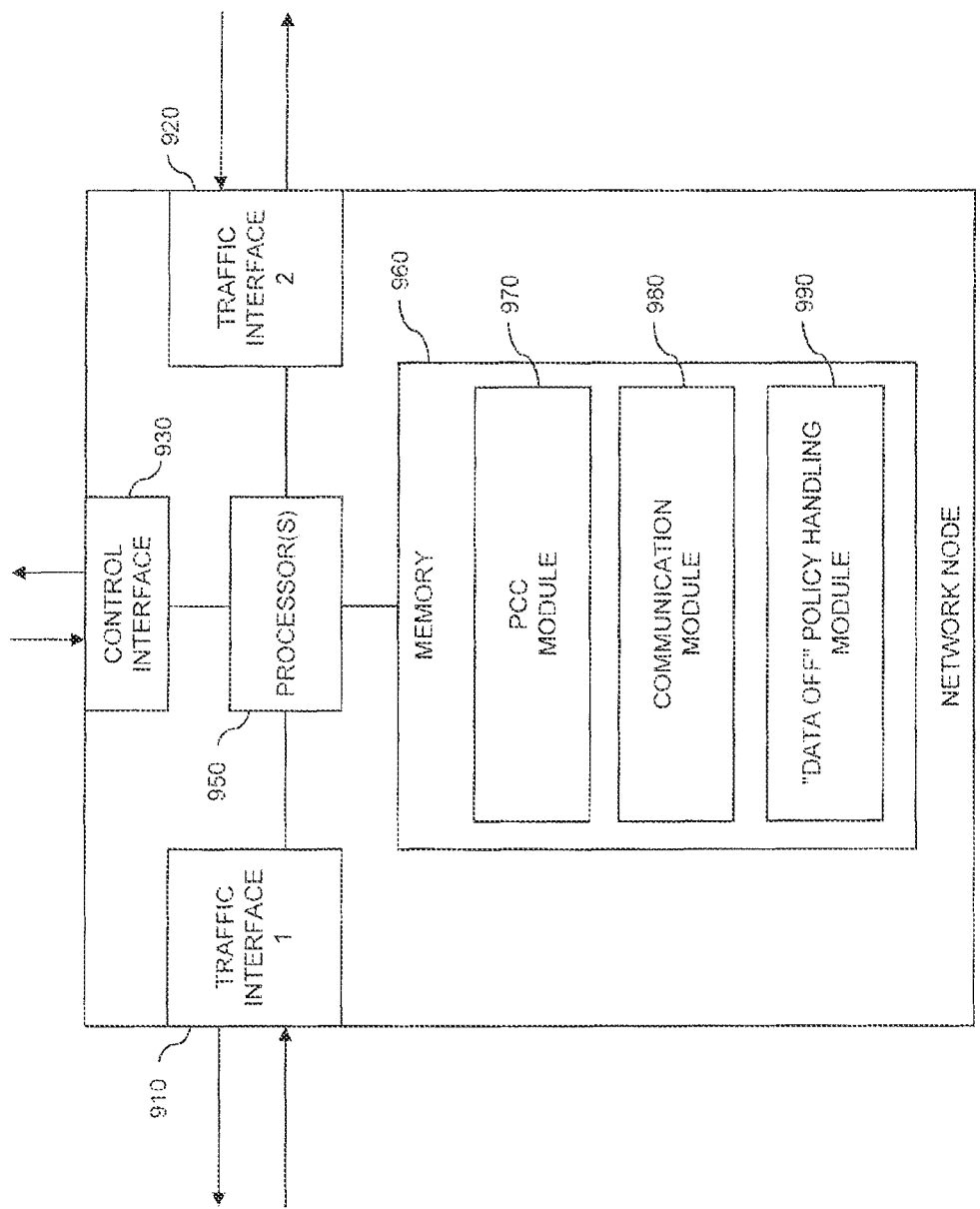
FIG. 9 schematically illustrates structures of a node according to an embodiment of the invention, e.g., corresponding to a node controlling handling of user plane data traffic.

FIG. 9 illustrates exemplary structures for implementing the above concepts in a node of a cellular network. For example, the illustrated structures may be used to implement a node which controls handling of user plane traffic, e.g., a PCC node such as the SGW 150, the PGW 160, or the PCRF 170.

In the illustrated example, the node includes a first traffic interface 910 for communication with one or more UEs and a second traffic interface 920 for communication with other network nodes. The first and second interfaces 910, 920 may in particular have the purpose of conveying user plane traffic of one or more UEs, such as the UE 10. Further, the node includes a control interface 930, which may be used for controlling the handling of user plane traffic. If the node corresponds to a PGW, such as the PGW 160, the control interface 930 may correspond to the Gx interface as illustrated in the architecture of FIG. 1. If the node corresponds to an SGW, such as the SGW 150, the control interface 930 may correspond to the Gxc interface as illustrated in the architecture of FIG. 1. If the node corresponds to a policy controller, such as the PCRF 170, the control interface 930 may correspond to the Gx and/or Gxc interface as illustrated in the architecture of FIG. 1. In the latter case, the traffic interfaces 910 and 920 may be omitted.

Further, the node includes one or more processor(s) 950 coupled to the interfaces 910, 920 and 930, and a memory 960 coupled to the processor(s) 950. The memory 960 may include a ROM, e.g., a flash ROM, a RAM, e.g., a DRAM or SRAM, a mass storage, e.g., a hard disk or solid state disk, or the like. The memory 960 includes suitably configured program code modules to be executed by the processor(s) 950 so as to implement the above-described functionalities of the node, e.g., corresponding to the method steps of FIG. 6. More specifically, the program code modules in the memory 960 may include a PCC module 970 so as to implement functionalities of controlling the handling of user plane traffic of one or more UEs, e.g., on the basis of a PCC mechanism. Further, the program code modules in the memory 960 may include a communication module 980 so as to implement the above-described functionalities of receiving the "data off" indication. Still further, the memory 960 may include a "data off" policy handling module 990 so as to implement the above-mentioned functionalities of selectively preventing the transmission of the packet data traffic subject to volume charging in response to receiving the "data off" indication, e.g., by configuring or installing at least one packet filter which blocks the packet data traffic associated with the volume charged packet data service while passing other packet data traffic.

It is to be understood that the structures as illustrated in FIG. 9 are merely schematic and that the node may actually include further components which, for the sake of clarity, have not been illustrated, e.g., further interfaces or further processors. Also, it is to be understood that the memory 960 may include further types of program code modules, which have not been illustrated, e.g., program code modules for implementing known functionalities of a PCC node, such as an PCRF, PGW, or SGW. In some implementations, also a computer program may be provided for implementing functionalities of the node, e.g., in the form of a physical medium storing the program code modules to be stored in the memory 960 or by making such program code available for download or streaming.

FIG. 10 illustrates exemplary structures for implementing the above concepts in a UE for a wireless communication network, such as the UE 10.

In the illustrated example, the UE includes a radio interface 1010 for connecting to the wireless communication network. The radio interface 1010 may for example be based on a packet based cellular radio technology, such as the LTE radio access technology. As further illustrated, the UE may include a user interface 1020, e.g., based on keys, a touch-sensitive surface, an optical display, and/or an acoustic input or output. The user interface 1020 may for example be used for selection of the "data off" state by a user of the UE.

Further, the node includes one or more processor(s) 1050 coupled to the radio interface 1010 and to the user interface 1020, and a memory 1060 coupled to the processor(s) 1050. The memory 1060 may include a ROM, e.g., a flash ROM, a RAM, e.g., a DRAM or SRAM, a mass storage, e.g., a hard disk or solid state disk, or the like. The memory 1060 includes suitably configured program code modules to be executed by the processor(s) 1050 so as to implement the above-described functionalities of the UE, e.g., corresponding to the method steps of FIG. 7. More specifically, the program code modules in the memory 1060 may include a "data off" state management module 1070 so as to implement functionalities of managing selection of the "data off" state, e.g., in response to a user selection via the user interface 1020 or in response to an automatic process, e.g., based on a schedule or triggering event. Further, the program code modules in the memory 1060 may include a communication module 1080 so as to implement the above-described functionalities of sending the "data off" indication. Still further, the memory 1060 may include a PCC module 1090 so as to implement the above-mentioned functionalities of installing a packet filter which blocks the packet data traffic associated with the volume charged packet data service while passing other packet data traffic.

It is to be understood that the structures as illustrated in FIG. 10 are merely schematic and that the UE may actually include further components which, for the sake of clarity, have not been illustrated, e.g., further interfaces or further processors. Also, it is to be understood that the memory 1060 may include further types of program code modules, which have not been illustrated, e.g., program code modules for implementing known functionalities of a UE. In some implementations, also a computer program may be provided for implementing functionalities of the node, e.g., in the form of a physical medium storing the program code modules to be stored in the memory 1060 or by making such program code available for download or streaming.

As can be seen, the concepts as described above may be used for efficiently controlling packet based connectivity in a wireless communication network. In particular, the concepts may be used for allowing appropriate usage of an access which offers only packet based connectivity, such as an LTE access, while at the same time avoiding undesired volume-charged traffic.

It is to be understood that the examples and embodiments as explained above are merely illustrative and susceptible to various modifications. For example, the prevention of volume charged packet data traffic implemented by an IMS node or the like, such as illustrated by the processes of FIG. 2, could be combined with the prevention of volume charged traffic by a PCC mechanism, such as illustrated by the processes of FIGS. 3 and 4. Further, various mechanisms could be used for providing the "data off" indication. For example, providing the indication during an attach procedure, as illustrated in FIG. 3, or a radio connectivity configuration procedure, as illustrated in FIG. 4, could also be used for conveying the indication to an IMS node by providing the indication to the HSS 180, from where it can be retrieved by the IMS node. Similarly, providing the indication during IMS registration or some other SIP procedure, as illustrated in FIG. 2, could also be used for conveying the indication to a PCC node by providing the indication to the HSS 180, from where it can be retrieved by the PCC node.

Further, the illustrated concepts could be used in connection with various types of cellular network technologies, without limitation to the above-mentioned LTE technology. Moreover, it is to be understood that the above concepts may be implemented by using correspondingly designed software to be executed by one or more processors of an existing device or network node, or by using dedicated hardware.

The invention claimed is:

1. A method of controlling packet data connectivity in a wireless communication network, the method comprising:
   a node of the wireless communication network receiving, from a user equipment, an indication that a limitation of volume charged packet data services is required for the user equipment; and
   depending on the received indication, the node preventing transmission of packet data traffic associated with the volume charged packet data services and allowing transmission of packet data traffic associated with one or more other packet data services;
   wherein the node receives the indication in at least one of:
      (A) a procedure for attaching the user equipment to the wireless communication network; and B) a procedure for configuring packet data network connectivity between the user equipment and the wireless communication network.

2. The method according to claim 1, wherein the indication indicates one of (A) that none of the volume charged packet data services are allowed for the user equipment and (B) that none of the volume charged packet data services are allowed while the user equipment is roaming, and wherein the indication further indicates one or more access networks in which the indication is applicable.

3. The method of claim 1, further comprising:
the node configuring at least one packet filter which blocks the packet data traffic associated with the volume charged packet data services and passes the packet data traffic associated with the one or more other packet data services, wherein the at least one packet filter operates in the user equipment.

4. The method according to claim 1, wherein the node prevents the transmission of the packet data traffic associated with the at least one volume charged packet data service by at least one of (A) inactivating a media component of the at least one of the volume charged packet data service and (B) rejecting a request associated with the at least one volume charged packet data service.

5. The method according to claim 4, wherein the node receives the indication in a procedure for registering the user equipment for the at least one volume charged packet data service.

6. A method of controlling packet data connectivity in a wireless communication network, the method comprising:
a user equipment detecting a command to switch off packet data connectivity of the user equipment,
in response to the command, the user equipment sending, to the wireless communication network, an indication that a limitation of volume charged packet data services is required for the user equipment;
wherein the user equipment sends the indication in at least one of:
(A) a procedure for attaching the user equipment to the wireless communication network; and
(B) a procedure for configuring packet data network connectivity between the user equipment and the wireless communication.

7. The method according to claim 6, wherein the indication indicates one of (A) that none of the volume charged packet data services are allowed for the user equipment and (B) that none of the volume charged packet data services are allowed while the user equipment is roaming, and wherein the indication further indicates one or more access networks in which the indication is applicable.

8. The method according to claim 6, further comprising:
in response to sending the indication, the user equipment receiving an indication of a packet filter; and
the user equipment installing the packet filter, the packet filter blocking the packet data traffic associated with the volume charged packet data services and passing the packet data traffic associated with the one or more other packet data services.

9. A node for a cellular network, the node comprising:
at least one interface; and
at least one processor, the at least one processor being configured to:
receive, from a user equipment, an indication that a limitation of volume charged packet data services is required for the user equipment; and
depending on the received indication, prevent transmission of packet data associated with the volume charged packet data services and allowing transmission of packet data associated with one or more other packet data services;
wherein the node receives the indication in at least one of:
(A) a procedure for attaching the user equipment to the wireless communication network; and
(B) a procedure for configuring packet data network connectivity between the user equipment and the wireless communication network.

10. The node according to claim 9, wherein the indication indicates one of (A) that none of the volume charged packet data services are allowed for the user equipment and (B) that none of the volume charged packet data services are allowed while the user equipment is roaming, and further indicates one or more access networks in which the indication is applicable.

11. The node according to claim 9, wherein the at least one processor is configured to configure at least one packet filter which blocks the packet data traffic associated with the volume charged packet data services and passes the packet data traffic associated with the one or more other packet data services, and wherein the packet filter operates in the user equipment.

12. The node according to claim 11, wherein the packet filter operates in at least one of (A) the node and (B) a further node of the wireless communication network.

13. The node according to claim 9, wherein the node is one of (A) an application server which is responsible for providing at least one of the volume charged packet data services and (B) a control server which is responsible for authorizing at least one of the volume charged packet data services.

14. The node according to claim 13, wherein the at least one processor is configured to prevent the transmission of the packet data traffic associated with the at least one volume charged packet data service by at least one of (A) inactivating at a media component of the at least one of the volume charged service and (B) rejecting a request associated with the at least one volume charged packet data service.

15. The node according to claim 13, wherein the at least one processor is configured to receive the indication in a procedure for registering the user equipment for the at least one volume charged packet data service.

16. A user equipment, comprising:
an interface for connecting to a wireless communication network; and
at least one processor, the at least one processor being configured to:
detect a command to switch off packet data connectivity of the user equipment, and
in response to the command, send to the wireless communication network an indication that a limitation of volume charged packet data services is required for the user equipment;
wherein the user equipment sends the indication in at least one of:
(A) a procedure for attaching the user equipment to the wireless communication network; and
(B) a procedure for configuring packet data network connectivity between the user equipment and the wireless communication.

17. The user equipment according to claim 16, wherein the indication indicates one of (A) that none of the volume charged packet data services are allowed for the user equipment and (B) that none of the volume charged packet data services are allowed while the user equipment is roaming, and wherein the indication further indicates one or more access networks in which the indication is applicable.

18. The user equipment according to claim 16, wherein the at least one processor is configured to:
- in response to sending the indication, receive an indication of a packet filter, and
- install the packet filter, the packet filter blocking the packet data traffic associated with the volume charged packet data services and passes the packet data traffic associated with the one or more other packet data services.

* * * * *